United States Patent [19]

Stuckenbrok

[11] Patent Number: 4,807,491
[45] Date of Patent: Feb. 28, 1989

[54] PEDAL CRANK AS WELL AS A PEDAL CRANK DRIVE FOR BICYCLES OR THE LIKE AND A MOUNTING FOR SUCH A PEDAL CRANK DRIVE

[76] Inventor: Freder Stuckenbrok, Rönnelstrasse 87, 2933 Jade 2, Fed. Rep. of Germany

[21] Appl. No.: 948,349
[22] PCT Filed: Mar. 27, 1986
[86] PCT No.: PCT/EP86/00191
 § 371 Date: Nov. 21, 1986
 § 102(e) Date: Nov. 21, 1986
[87] PCT Pub. No.: WO86/05755
 PCT Pub. Date: Oct. 9, 1986
[51] Int. Cl.⁴ .............. G05G 1/14; B62M 3/04
[52] U.S. Cl. .................... 74/594.1; 74/594.3
[58] Field of Search .......... 74/594.3, 594.1, 602, 74/600, 601

[56] References Cited

U.S. PATENT DOCUMENTS

| 641,728 | 1/1900 | Robinson | 74/594.3 |
|---|---|---|---|
| 641,729 | 1/1900 | Robinson | 74/594.3 |
| 653,873 | 7/1900 | Malone | 74/594.3 |
| 4,125,239 | 11/1978 | Berclaz et al. | |
| 4,446,754 | 5/1984 | Chattin | 74/594.3 |
| 4,519,271 | 5/1985 | Chattin | 74/594.3 |

FOREIGN PATENT DOCUMENTS

| 349753 | 4/1928 | Belgium . | |
|---|---|---|---|
| 93201 | 11/1983 | European Pat. Off. . | |
| 94796 | 2/1895 | Fed. Rep. of Germany . | |
| 113321 | 9/1900 | Fed. Rep. of Germany | 74/594.3 |
| 918488 | 9/1954 | Fed. Rep. of Germany | 74/594.3 |
| 10961 | 5/1909 | France | 74/594.3 |
| 554935 | 6/1923 | France | 74/594.3 |
| 650709 | 1/1929 | France | 74/594.3 |
| 34293 | 3/1929 | France . | |
| 37029 | 9/1930 | France | 74/594.3 |
| 867468 | 11/1941 | France | 74/594.3 |
| 907486 | 3/1946 | France . | |
| 929797 | 1/1948 | France | 74/594.3 |
| 973667 | 2/1951 | France . | |
| 978498 | 4/1951 | France . | |
| 2492936 | 4/1982 | France | 74/594.3 |
| 2498715 | 7/1982 | France | 74/594.3 |
| 450597 | 7/1949 | Italy | 74/594.3 |
| 466956 | 11/1951 | Italy | 74/594.3 |
| 611342 | 10/1960 | Italy | 74/594.3 |
| 186431 | 9/1936 | Switzerland . | |
| 224823 | 12/1942 | Switzerland . | |
| 6786 | of 1896 | United Kingdom | 74/594.3 |
| 11105 | of 1897 | United Kingdom | 74/594.3 |
| 12498 | of 1899 | United Kingdom | 74/594.3 |

Primary Examiner—Richard E. Moore
Assistant Examiner—Rodney M. Lindsey
Attorney, Agent, or Firm—Wood, Herron & Evans

[57] ABSTRACT

The invention concerns a pedal crank as well as a pedal crank drive built up from it for bicycles or the like, in which the effective length of the pedal crank may be altered during the course of the driving stroke by a control stud for alteration of the lever arm. The invention concerns in particular the construction of the pedal crank from a U-shaped basic profile onto which is pushed a covering profile for closing it off and for stiffening and is indissolubly connected to it. The parts of the pedal crank are supported by ball bearings and blocking of the balls during the up and down movement of the pedal cranks is avoided through a special guidance of the balls. The invention also concerns the special construction of the pedal crank drive with a specially constructed eccentric bearing which at the same time absorbs torsional forces by supporting a control stud on the pedal cranks.

18 Claims, 8 Drawing Sheets

PEDAL CRANK AS WELL AS A PEDAL CRANK DRIVE FOR BICYCLES OR THE LIKE AND A MOUNTING FOR SUCH A PEDAL CRANK DRIVE

The invention concerns a pedal crank for a pedal crank drive for bicycles or the like, consisting of a crank arm and a pedal-carrier arm which by means of a control stud arranged on the pedal-carrier arm may during the course of the driving stroke be shifted with respect to one another for the adjustment of the effective length of pedal crank, the said crank arm consisting of an essentially U-shaped basic profile having ball raceways arranged on the inside of both limbs and the said pedal-carrier arm on two sides lying opposite one another being provided with ball raceways and being supported by a corresponding filling of balls to be able to shift in the crank arm, the open areas of the crank arm being closed off by cover means.

From the CH-PS No. 224 823, the EP-A No. 93 201, the DE-PS No. 94 796 and the FR-PS No. 973 667 drive mechanisms for bicycles or the like are already known, in which the length of pedal crank gets altered via a control stud in such a way that during the downwards movement a lengthened lever arm results and during the upwards movement a shorter one. Although such pedal crank gears have often been proposed already during past decades these ways of relieving the drive have hitherto not been able to succeed, in which case the reason may indeed have lain in the fact that these drives and the corresponding pedal cranks had to be of comparatively heavy and costly construction so that the individual parts of the pedal cranks withstood the high loadings occurring without too great wear. But such a construction disfigured the bicycles so that the market has not accepted these solutions.

The forces arising in the pedal crank in the case of the known constructions were moreover so high that this led to a considerable tightness in the drive so that the gain in easy running achieved through the adjustment of the lever arm was wasted again through friction. In addition, during the transmission of the control movement to the control stud on the pedal crank heavy torsional forces act upon the latter, which must be taken up by the linear guidance between the crank arm and the pedal-carrier arm of the pedal crank. The linear guidance must for this reason be designed not only for accepting the tilting forces between the pedal-carrier arm and the crank arm through the driving torque but also for taking up the torsional forces acting upon the control stud, which demands a very rigid and therefore as hitherto necessary, a very heavy construction.

The problem underlying the present invention is to propose a pedal crank for a pedal crank drive for bicycles or the like, which in a simple way may be produced from inexpensive materials, makes possible a robust yet light construction and moreover guarantees easy operation.

This problem is solved in accordance with the invention in such a way that the basic profile of the crank arm exhibits on the outsides of the limbs of the U longitudinal grooves continuous over the whole length and the covering profile is made with an essentially U-shaped continuous profile having reentrant limbs, that the covering profile is inserted with its limbs in the longitudinal grooves in the basic profile, is pushed onto the basic profile in the longitudinal direction and the two parts are connected indissolubly together, that the covering profile on the side of the crank arm is provided with an elongated hole for bringing out the control stud and that the ends of the crank arm are closed off by endcaps.

This construction has the advantage that for the greater part cheap profiled material may be employed, which leads to a considerable saving in the cost of production yet good quality.

After the production of the indissoluble connection between the basic profile and the covering profile a box-shaped crank arm results having extremely high rigidity. This construction has the further advantage that all of the profiles of the crank arm may be obtained as goods sold by the meter without there still being necessary after cutting off to measurement, considerable machining processes.

For the transmission of the torques to the axle of the crank a pedal crank boss is necessary, which is accordance with an advantageous refinement of the invention is welded or soldered to the outside of the covering profile.

As a seal for the pedal-carrier arm where it is led out of the crank arm, in accordance with an advantageous refinement of the invention a sealing cap is provided, the sealing region of which may be slid onto the end of the basic profile pointing to the pedal-carrier arm, moreover a tongue from the sealing cap is led round the basic profile in a further longitudinal groove in the latter and is provided at the other end with an anglepiece to which may be screwed a cover sealing the other end of the basic profile. These measures assist the aim of not having to perform essentially any further machining processes upon the basic profile obtainable as goods sold by the meter, after the cutting to length. For improvement of the sealing of the pedal crank the opening in the sealing region of the sealing cap is advantageously adapted to the profile of the pedal carrier arm and is provided with a seal.

In order to improve the easy action of the ball bearing between the crank arm and the pedal-carrier arm and in order in particular to avoid locking through migration of the balls because of the motion of the crank, a particularly advantageous embodiment is characterized in that the balls arranged between the ball raceways on the crank arm and on the pedal-carrier arm are guided by means of a ball cage in the direction longitudinal to the pedal crank and that the ball cage is kept by a locating device within a certain range of the ball raceways. For the control of the ball cage an advantageous refinement of the invention is characterized in that the ball cage bears via a compression spring against each of two endstops on the pedal-carrier arm and adopts a position of equilibrium corresponding with the different extensions of the pedal-carrier arm because of the spring forces which arise. In accordance with a further embodiment this may be designed in a simple way such that the pedal-carrier arm is provided with a hole drilled longitudinally and made as a blind hole which is provided with a longitudinal slot and at the other with a stopper, that a guidepin is supported in this longitudinal drilled hole between two compression springs, and that a guide-stud arranged on the guidepin engages through the longitudinal slot in a recess-in the ball cage.

Sealing of the control stud where it is led out of the crank arm is advantageously effected in such a way that the elongated hole in the covering profile is sealed from the inside by at least one slidable sealing-blade which is provided with an elongated hole and which is arranged between the covering profile and a recess in the basic profile, and the pedal-carrier arm. In order to manage with as few sealing blades as possible, in particular with only a single one, a particularly advantageous embodiment is characterized in that the area of the pedal-carrier arm showing at the elongated hole in the covering profile lies as a plane area at the same level as the recess in the basic profile and together with it forms a sealing area for the sealing-blade. By the interior of the covering profile under the pedal crank boss being kept free, the sealing blade may extend as far as into this region under the pedal crank boss, so that a very large range of cover is provided between the pedal carrier arm and the sealing blade.

The present invention concerns also a pedal crank gear which may be applied particularly advantageously in combination with the pedal cranks described above, as well as a mounting for the pedal crank gear in accordance with the invention.

From the CH-PS No. 224 823 and from the EP-A No. 93 201 drive mechanisms for bicycles or the like are already known, in which the length of pedal crank gets altered via a control stud in such a way during the downwards movement a lengthened lever arm results and during the upwards movement a shorter one.

The control of the control stud is effected in that case via a connecting link guide, the form of which determines the ratio of adjustment of the lever arm upon the crank axle. This known drive mechanism having a connecting link guide has the disadvantage that between the sensing element actuating the control stud and the guide track considerable frictional forces arise which lead to a heavy action of the drive such that the gain in ease of action achieved through the adjustment of the lever arm gets wasted again through friction. Furthermore such a connecting link guide is difficult to seal against the influence of dust, which, however, is indispensable for robust service of a bicycle.

Finally in the case of the transmission of the control motion from the sensing element in the connecting link guide to the control stud on the pedal crank heavy torsional forces act upon the latter, which must be taken up by the linear guidance between the crank arm and the pedal-carrier arm of the pedal crank. The linear guidance must for this reason be designed not only for accepting the tilting forces between the pedal-carrier arm and the crank arm through the driving torque but also for taking up the torsional forces acting upon the control stud, which demands a very rigid and therefore a very heavy construction.

From the FR-PS No. 973 667 a pedal crank gear is indeed known, having a bearing arrangement arranged eccentrically with respect to the axis of the pedal crank, by which for the control stud of the pedal crank an eccentric path may be generated, but for taking up the tilting forces generated through the torsion this solution is not suitable.

The problem underlying the present invention is to propose a pedal crank gear for bicycles or the like, by which the torsional forces arising in the pedal cranks may be reduced by part of them being taken up by the eccentric bearing in order in this way to arrive at a robust construction and easy running.

This problem is solved in accordance with he invention in such a way that the bearing arrangement consists of at least three bearing rollers which are supported on the rotatable bearing portion and which ride radially on a bearing race on the stationary bearing portion, and that the control stud is arranged on the crank arm and is supported in a bearing bush arranged on the rotatable bearing portion in the free space between the bearing rollers in approximately the same plane.

Such a pedal crank gear has the advantage that the control stud in its bearing bears against the rotatable bearing portion so that upon it and therefore upon the bearing in the pedal crank only small torques act. In this way it is possible to design the construction of the pedal crank itself to be simpler and lighter.

Such a solution has the advantage that between the bearing rollers in the same plane a free space is available in which in accordance with a further refinement of the invention the control stud may be supported in a bearing bush arranged on the rotatable bearing portion. This arrangement of the bearing bush for the control stud in the same plane between the bearing rollers leads to a further reduction in the torque exerted upon the control stud so that both in the bearing of the control stud and also in the linear guidance of the pedal crank lower pressures and hence frictional forces arise so that an extraordinarily easy-running pedal crank gear is made possible.

The bearing arrangement having at least three bearing rollers is preferably made in such a way that the stationary bearing portion is provided with an outer bearing race in the form of a groove in which the bearing rollers engage from outside and ride along it. The stationary bearing portion and the rotatable bearing portion have to be sealed in a simple manner with respect to one another to be dusttight, which in the case of a connecting link guide would be considerably more elaborate. Above all it is in the case of the pedal crank gear in accordance with the invention possible for the control stud to be able to turn about its axis in the rotatable bearing portion of the bearing arrangement, but to be supported in every other plane so that torsional forces are scarcely transmitted to the pedal crank.

In order to be able to adapt the power ratio of the pedal crank gear to the wish of the user, in accordance with a further advantageous refinement of the invention a number of drilled holes are arranged in the pedal-carrier arm at different distances from the axis of the pedal, into which the control stud may be screwed at option for the selection of the power ratio.

The construction of the pedal crank gear in accordance with the invention also enables a very simple and rigid mounting for the fastening of the bearing arrangements of two pedal crank gears on opposite sides of the bottom bracket bearing of a bicycle frame or the like. Such a mounting is characterized by two carrier discs fastened to the stationary bearing portions of the bearing arrangements and each having a cut-out which is pushed with a close fit onto the respective end of the bottom bracket bearing tube for location in the radial direction, and a clamp arrangement fastened to the frame and to the two carrier discs for the axial location of the carrier discs. With such a mounting the pedal crank gears may in a simple way be fastened or fitted later to a standard bicycle or the like without major alterations having to be performed on the bicycle. In this way it is possible to equip bicycles either in standard execution or in the execution with the pedal crank gear in accordance with the invention without in doing so having to perform prepared alterations in the standard execution of the bicycle.

Such a mounting is preferably made in such a way that the clamp arrangement consists of a first part screwed to a mounting plate for a bicycle rest and having a stud bolt, as well as a second part which is screwed to the first part via an oblong hole on the stud bolt and to which are fastened the two carrier discs for the mounting of the bearing arrangements. One of the two carrier discs is preferably made as the inner part of a chain case to which the outer part of the chain case is screwed and carries the bearing arrangement at this side. The chain case is hereby included in the mounting for supporting the pedal crank gear, which leads to a very rigid fastening yet with a neat appearance. The clamp arrangement preferably exhibits a number of brackets embracing the sprocket wheel, to which the outer part of the chain case as well as the bearing arrangement at this side are fastened.

The invention is explained in greater detail below with the aid of embodiments by reference to the attached drawings. There is shown in.

Figure 1:
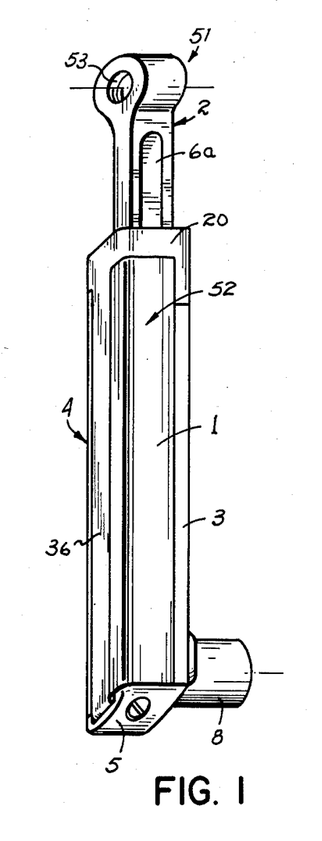
FIG. 1—a perspective of a complete pedal crank in accordance with the invention.
Figure 2:
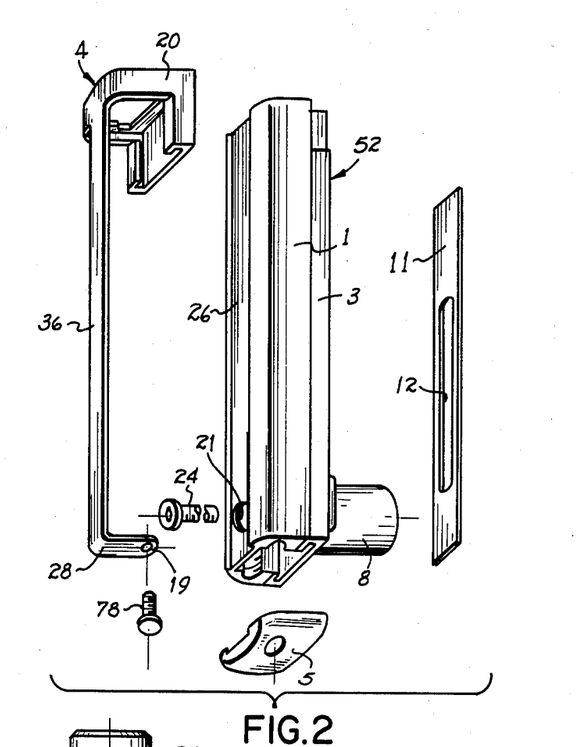
FIG. 2—the pedal crank arm of the pedal crank as in FIG. 1 in the exploded state.
Figure 3:
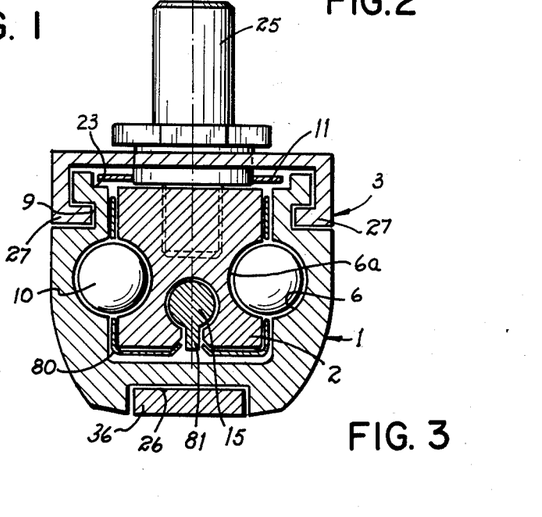
FIG. 3—a cross-section through the pedal crank as in FIG. 1, the individual parts being drawn for the sake of clarity at distinct clearances.

The pedal crank 51 shown in FIGS. 1 to 3 consists of a crank arm 52 and a pedal-carrier arm 2 supported to be able to shift in it. The pedal crank 51 may be pushed by a pedal crank boss 8 by means of an internal square profile (see FIG. 4) onto a square profile of a pedal crank axle (not shown) of a bicycle and screwed to it. At the end of the pedal-carrier arm 2 a tapped hole 53 is provided into which the axle of a pedal may be screwed. The reference number 53 designates below a pedal axle. The pedal-carrier arm 2 may be shifted with respect to the crank arm 52 in the longitudinal direction in order during the downwards movement of the driving stroke to bring about a longer lever arm (between the pedal axle 53 and the pedal crank boss 8) for the purpose of increasing the torque, whilst during the upwards movement of the pedal crank 51 the lever arm is reduced in order during pedalling not to have to draw the foot back so far.

The crank arm 52 consists of a basic profile 1 which has an essentially U-shaped cross-section. On the inside of the basic profile 1 ball raceways 6 are provided lying opposite one another. The pedal carrier arm 2 is arranged between the two limbs of the basic profile 1 and likewise exhibits on opposite sides semicircular ball raceways 6a. Between these ball raceways 6 and 6a balls 10 are arranged which are held by a ball cage 80 in a certain position in the direction longitudinal to the pedal crank.

The basic profile 1 open at the top (as seen in FIG. 3) is closed by a covering profile 3, that is, in such a way that the basic profile is provided over the whole length in both limbs with longitudinal grooves 9 into which from both sides engage correspondingly reentrant limbs 27 of the covering profile 3. The covering profile 3 (see also FIG. 4) is for this purpose made essentially U-shaped in cross-section, the already mentioned limbs 27 lying in continuation of the arms of the U. In this way it is possible to slide the covering profile 3 onto the basic profile 1 so as to connect them rigidly together. This connection may be further improved by both parts being connected indissolubly together, e.g., welded, soldered or glued, in order in this way to form an extraordinarily rigid box girder construction. The basic profile 1, the covering profile 3 and the pedal carrier arm 2 may consist of drawn material as goods sold by the meter from which corresponding pieces are cut off.

In the covering profile 3 an elongated hole 7 is provided through which a control stud 25 (FIG. 3) is passed and screwed to the pedal-carrier arm 2. This control stud 25 serves for the shifting of the pedal-carrier arm 2 with respect to the crank arm 52 for the purpose of alteration of the lever arm between the pedal axle 53 and the pedal crank boss 8. The control of the control stud 25 is not described here in greater detail because this does not belong to the present invention.

The basic profile 1 exhibits on the closed side of it a longitudinal groove 26 which serves for receiving a tongue 36 from a sealing cap 4. This sealing cap 4 exhibits at the pedal end a sealing region 20 from which the pedal carrier arm 2 is led out and which exhibits an opening having a profile corresponding with the profile of the pedal carrier arm 2. In addition another seal (not shown) exists in this opening. The end region 20 further exhibits a profiled piece similar to the profile of the covering profile 3, which may be pushed into the corresponding longitudinal groove 9 in the basic profile 1. After the sliding of the sealing region 20 onto the basic profile 1 the latter is satisfactorily closed off without special screw connections being necessary. The sealing cap 4 at the other end of it in extension of the tongue 36 is provided with an anglepiece 28 which during sliding of the sealing region 20 onto the basic profile 1 must be raised a little. After the sealing cap 4 has been pushed completely on, the anglepiece 28 embraces the basic profile, After that a cover 5 is screwed by a screw 78 firmly into a tapped hole 19 in the anglepiece 28. The other end of the crank arm 52 is closed by this cover 5.

The pedal crank boss 8 is fastened to the outer face of the covering profile 3 by welding or the like. Hence the basic profile 1 may essentially be prefabricated as profiled material without subsequent machining being necessary. In the basic profile 1 a screwhole 21 is provided through which a connecting screw 24 may be passed and screwed into the end of a pedal crank axle (not shown) for the purpose of fastening the pedal crank boss 8. This screwhole 21 is covered by the tongue 36.

In order during the complete revolution of the pedal crank 51 to guarantee an easy-acting shifting of the pedal-carrier arm 2 with respect to the crank arm 52 it is necessary that the balls 10 may be able to roll freely in their ball raceways 6, 6a under load. But since the pressure loading during the rotation of the pedal crank 51 is not constant—it occurs essentially only during the downwards movement of the pedal crank 51—the balls 10 do not execute only a pure rolling motion but through their dead weight as well as through centrifugal force have the tendency to change their position beyond the rolling motion. They would migrate outwards from the center of the pedal crank 51 and after a few revolutions would have reached the outer end point in the ball raceways 6, 6a and during the next power stroke would block a further shifting motion completely before the pedal-carrier arm 2 has been shifted with respect to the crank arm 52 into the outer end position, if special precautions had not been taken which prevented the migration of the balls over several revolutions of the pedal crank 51. This risk of blocking is further increased through the torsional forces acting upon the pedal crank because of the offset action of force upon the pedals.

Figures 4, 5:
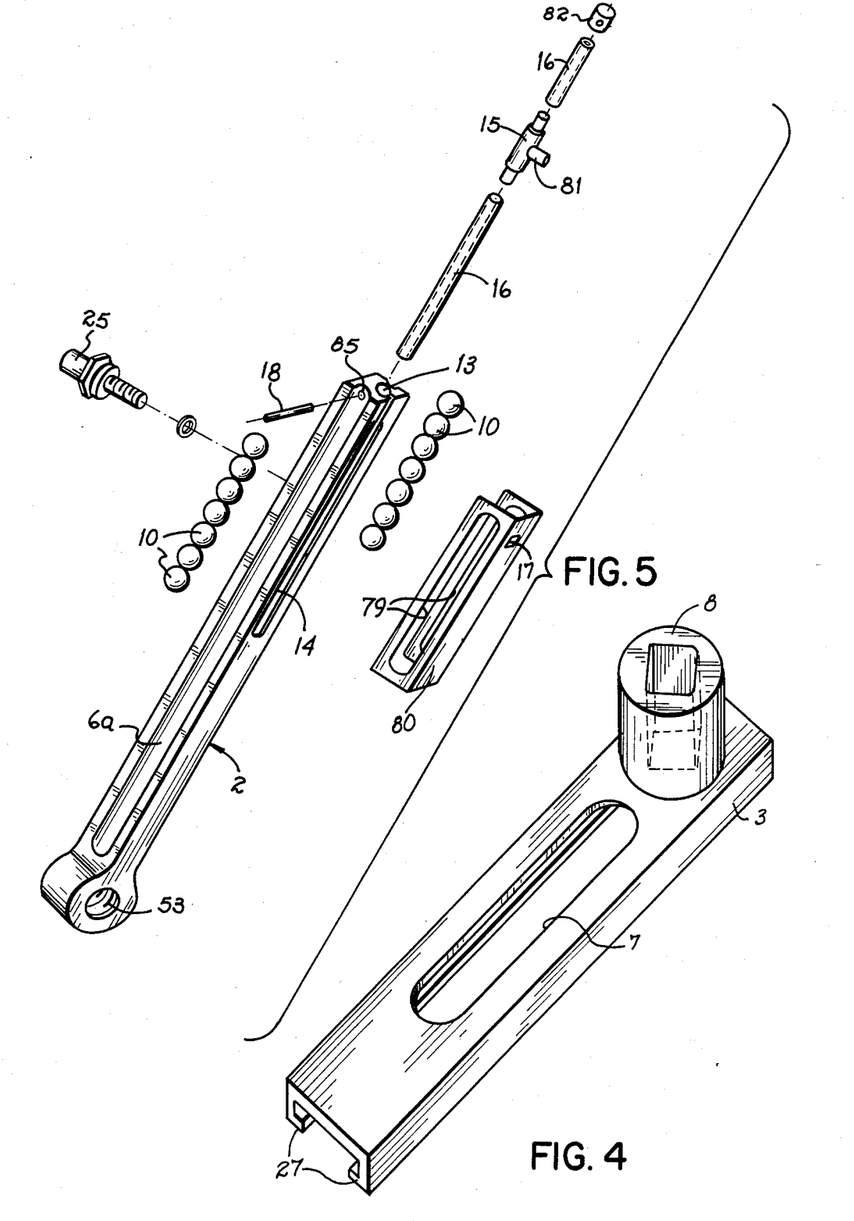
FIG. 4—a perspective of a covering profile for the pedal crank as in FIG. 1.
FIG. 5—a perspective of a pedal-carrier arm of the pedal crank as in FIG. 1 in the exploded state of the individual parts.

FIG. 5 now shows the arrangement of the different parts for the prevention of such blocking. The balls 10 running between the ball raceways 6, 6a are arranged in elongated holes 79 in a ball cage 80. The pedal-carrier arm 2 is provided with a hole 13 drilled longitudinally which is open to the side via a slot 14 made at the side. This longitudinal drilled hole 13 is made as a blind hole into which a first spring 16, a guidepin 15 and a second spring 16 are inserted. The longitudinal drilled hole 13 is then closed by a stopper 82 through the insertion of a pin 18 into a hole 85 drilled transversely. The guidepin 15 carries at the side a guide stud 81 which is led out of the longitudinal slot 14 and engages in a recess 17 in the ball cage 80. Through the position of the guidepin 15 the position of the ball cage 80 in the longitudinal direction is thus established (see in this connection also FIG. 3).

Figures 6A, 6B, 6C:
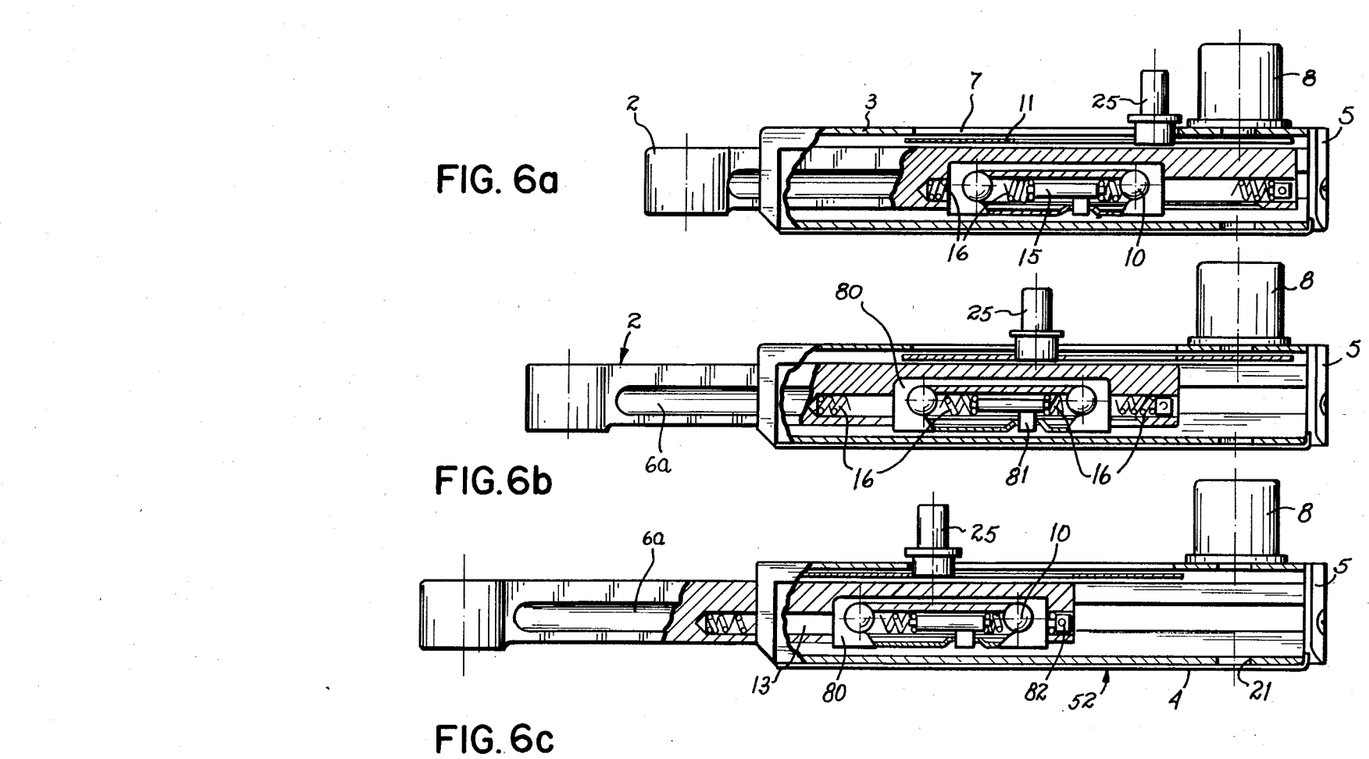
FIGS. 6a, 6b, 6c—the pedal crank as in FIG. 1, partially sectioned, for representation of the ball bearing in three different positions of the pedal-carrier arm.

FIGS. 6a to 6c show the individual positions of the ball cage 80 with different positions of the pedal-carrier arm 2 with respect to the crank arm 52. In the run-in state of the pedal-carrier arm 2 (FIG. 6a) the ball cage 80 with the balls 10 is lying in a starting position which in the unloaded state of the bearing is determined by the equilibrium of the spring forces of the springs 16 on opposite sides of the guidepin 15. If the pedal-carrier arm 2 now gets pushed outwards with respect to the crank arm 52 under loading of the bearing (FIG. 6b) the balls 10 roll along the ball raceways 6, 6a and take the ball cage 80 including the guide stud 81 and the guidepin 15 with them. The right-hand (in FIGS. 6a–6c) spring 16 in this case gets compressed and the left-hand spring 16 gets unloaded. Further shifting of the pedal-carrier arm 2 under load into the outer end position (FIG. 6c) leads with further rolling of the balls 10 to further stressing of the right-hand spring 16.

With one of the springs 16 in the stressed state, as soon as the load falls away from the pedal-carrier arm 2, e.g., at bottom dead center of the crank motion, the loading on the balls 10 in the ball raceways 6, 6a also falls away, so that the stressed spring 16 brings the ball cage 80 with the balls 10 back again with respect to the pedal carrier arm 2 into the unstressed position of equilibrium. Through this advantageous location of the balls it is thus achieved that the ball cage 80 with the balls 10 constantly gets brought back into the starting position at unloading and hence blocking is reliably avoided.

Figure 7A:
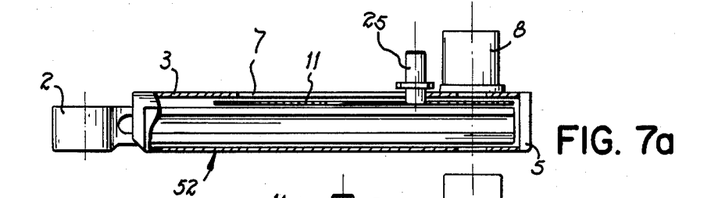
FIGS. 7a, 7b, 7c—illustrations similar to FIG. 6 for the explanation of the different positions of the sealing blade, balls and ball cage being omitted for the sake of clarity.
Figure 7B:
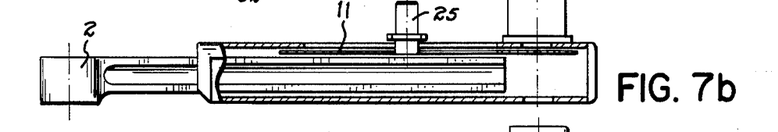
Figure 7C:
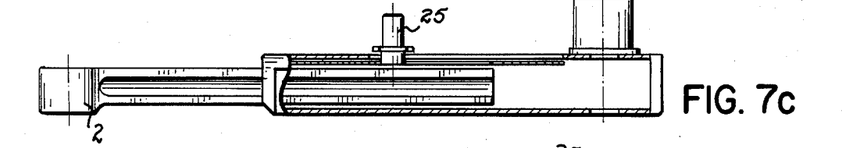
Figure 8A:
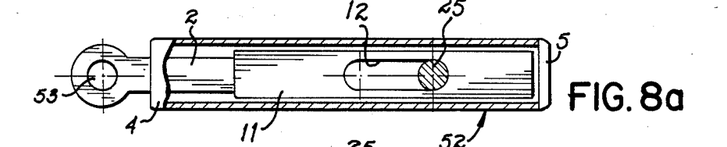
FIGS. 8a, 8b, 8c—a plan of the pedal crank arm in similar positions to FIG. 7 for the explanation of the different positions of the sealing blade.
Figure 8B:
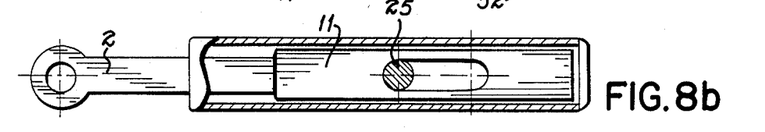
Figure 8C:
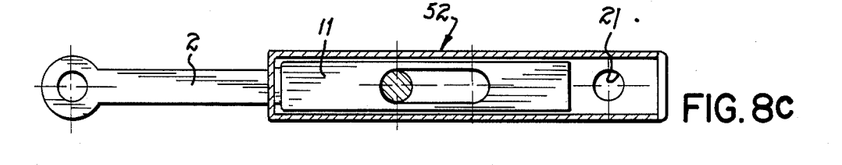

In FIGS. 7 and 8 details are now shown of the sealing of the elongated hole 7 in the covering profile 3 towards the outside. As may be seen in FIG. 3 there is provided between a recess 23 in the basic profile 1 and the upper (in FIG. 3) plane face of the pedal crank arm 2 at one side and the inner face of the covering profile 3 at the other, a sealing blade 11 which exhibits an elongated hole 12 so that the control stud 25 may be led through. As already mentioned, in FIG. 3 the individual parts are drawn with large clearances only for the sake of clarity. Obviously the sealing blade 11 rests against the recess 23 and the upper face of the pedal-carrier arm 2 and furthermore touches the inside of the covering profile 3 in order to guarantee satisfactory sealing.

In the position as in FIGS. 7a and 8a the pedal-carrier arm 2 is lying in the run-in state and the control stud 25 projecting out of the elongated hole 12 in the sealing blade 11 has shifted the latter into the outermost, right-hand (in the Figures) position. Through the pedal crank boss 8 being welded to the covering profile 3 on the outside the space lying blow it is free for the shifting of the sealing blade 11. In this position according to FIGS. 7a and 8a the inside of the crank arm 52 is thus sealed towards the outside.

After the pedal-carrier arm 2 has been shifted a little towards the left (see FIGS. 7b and 8b) the sealing blade 11 remains first of all in its first position as long as the control stud 25 still does not butt against the end of the elongated hole 12. In this position too a satisfactory sealing is effected. If the pedal-carrier arm 2 is moved further towards the left, the control stud 25 via the end of the elongated hole 12 takes the sealing blade 11 towards the left with it and in the left-hand end position (see FIGS. 7c and 8c) seals off the free space lying above the right-hand end of the pedal-carrier arm 2 towards the top with respect to the elongated hole 7 in the covering profile 3. Upon the movement of the pedal-carrier arm 2 towards the right the sealing blade 11 is carried with it in the reverse sequence.

Hence an opening 7 which is long in relation to the overall length of the crank arm 52 is adequately sealed off by one single sealing blade 11 in combination with the inside of the pedal-carrier arm 2 made as a plane area.

Figures 9, 10:
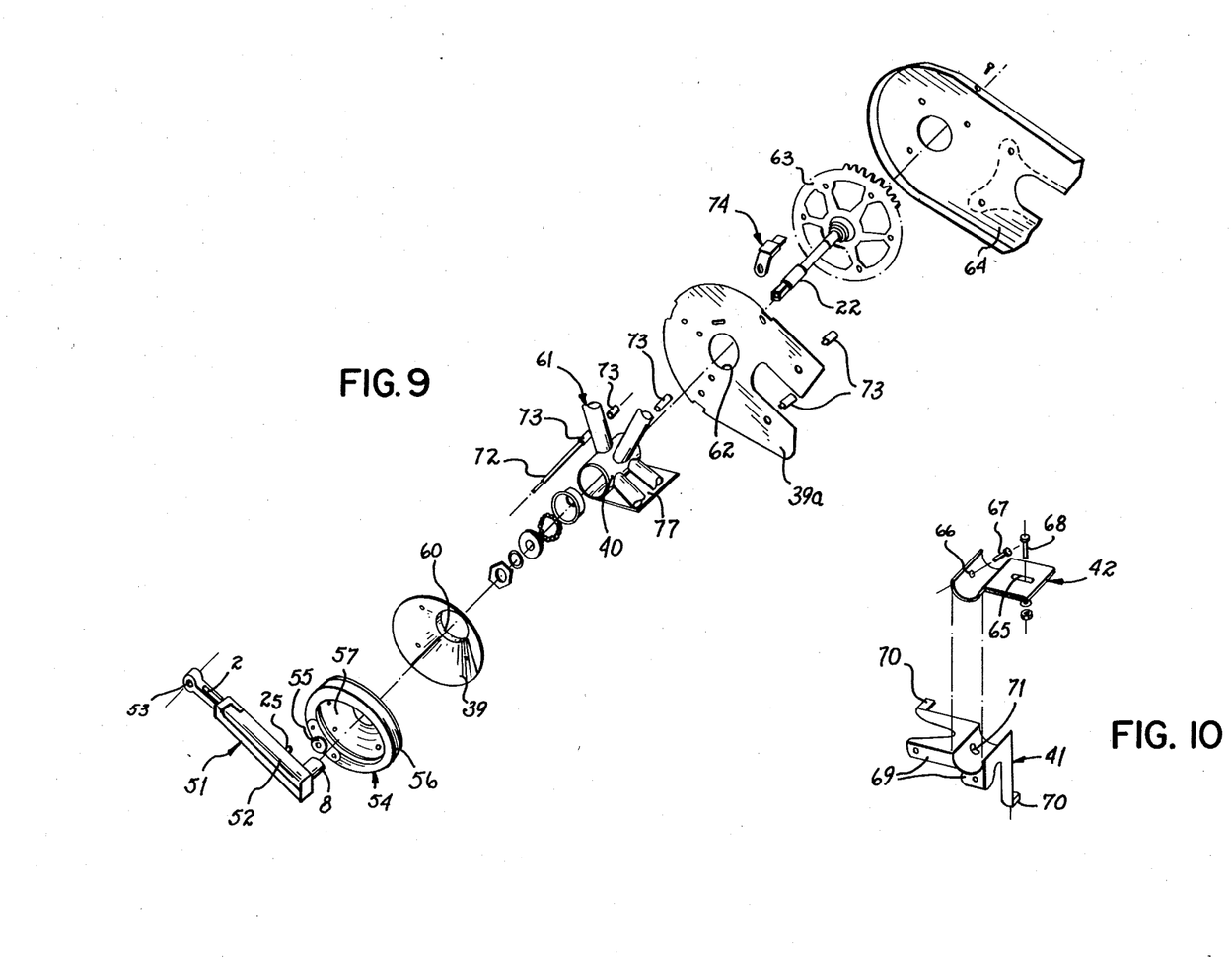
FIG. 9—a perspective of the association of the individual parts of the pedal crank gear in accordance with the invention in an exploded view.
FIG. 10—a perspective of a clamp arrangement in an exploded view.

In the illustration according to FIG. 9 a cutaway portion of a bicycle frame in the region of the bottom bracket bearing is shown and provided with the reference number 61. To this frame 61 is fastened by means of a carrier disc 39 a bearing arrangement 54 which in FIG. 9 is made as a ring ball bearing. Particulars of the fastening are explained in detail later.

The bearing arrangement 54 has a stationary bearing portion 57 and a rotatable bearing portion 56 and onto the latter is fastened a bearing bush 55 for receiving a control stud 25 of a pedal crank 51. The pedal crank 51 consists of a crank arm 52 and a pedal-carrier arm 2 which is provided at the end of it with a tapped hole into which a pedal (not shown) may be screwed. The reference number 53 here characterizes the pedal axle. On the crank arm 52 is arranged a pedal crank boss 8 which exhibits an internal square which may be pushed onto a corresponding external square on a pedal crank axle and may be fixed by screws.

This pedal crank gear described hitherto is (in the drawing as FIG. 9) arranged on the left-hand side of the bottom bracket bearing. On the right-hand side (in the drawing) of the bottom bracket bearing, that is, behind the chain case consisting of the parts 39a and 64, lies a similar arrangement of a pedal crank gear having a bearing arrangement 54 and a pedal crank 51. But for the sake of simplicity this pedal crank gear is not shown in the drawing, but it works in the same way.

Figure 11:
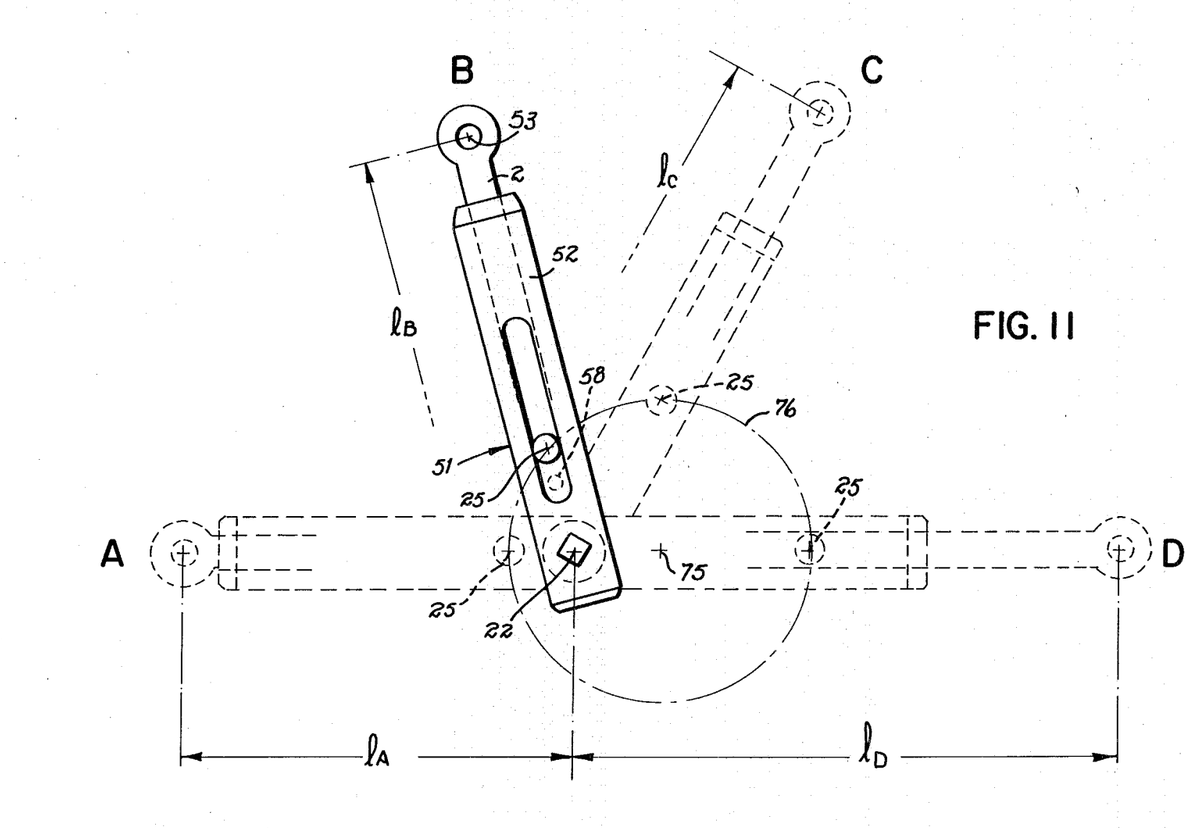
FIG. 11—a schematic motion diagram of the pedal crank gear in accordance with the invention in four different positions A, B, C and D.

The kinematics of the pedal crank gear in accordance with the invention is now to be described below with reference to FIG. 11. In this illustration the reference number 75 represents the center of the bearing arrangement 54 which with respect to the pedal crank axle 22 on the bicycle is displaced forwards (in FIG. 11 towards the right). The bearing bush 55 with the control stud 25 supported in it describes during rotation of the rotatable bearing part 56 a circular path which in FIG. 11 is indicated by a dash-dot line 76. Thus the pedal-carrier arm 2 during the course of one stroke of the crank gets shifted with respect to the crank arm 52 and thereby with respect to the pedal crank axle 22 via the control stud 25 associated with it and there result during the course of one revolution of the pedal crank different lever arms between the pedal axle and the pedal crank axle.

In the rear position A of the pedal crank the pedal-carrier arm 2 is pulled into the crank arm 52 so that only a short lever arm $l_A$ results In the intermediate positions B and C the pedal-carrier arm 2 is already run out so that longer lever arms $l_B$ and $l_C$ respectively result. In the position D the pedal-carrier arm 2 is run fully out and the longest lever arm $l_D$ results.

The pedal axle 53 describes with respect to the pedal crank axle 22 an essentially eccentric circular path which leads to the situation that in riding the bicycle or the like a longer lever arm is available during the downwards movement of the pedals whilst during the return of the pedal a shorter travel has to be described.

The power ratio of the pedal crank gear in accordance with the invention may be adapted in a simple way to the needs of the user if the control stud 25 may be arranged with respect to the pedal-carrier arm 2 in different positions, which is facilitated by a number of drilled holes 58 (FIG. 11). If the control stud 25 is screwed into the drilled hole 58 indicated in FIG. 11, the lever arm of the pedal crank is lengthened by a small amount; but this amount must also be put up with during the return motion.

Figure 12:
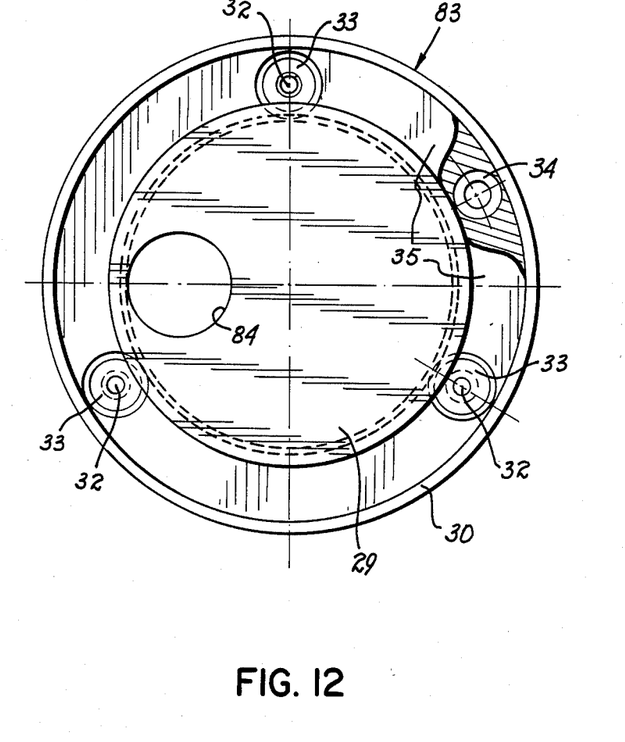
FIG. 12—a side elevation, partially sectioned, of a preferred bearing arrangement.
Figure 13:
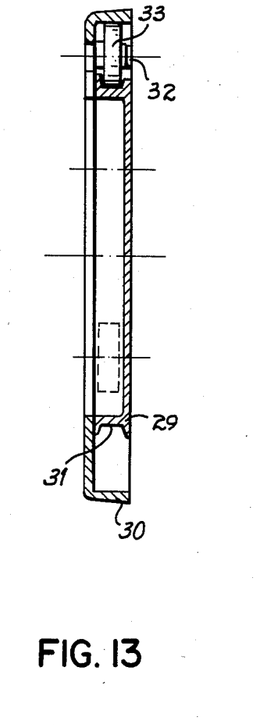
FIG. 13—a section through the arrangement as in FIG. 12.

Whilst the bearing arrangement 54 illustrated in FIG. 9 is a single ring ball bearing, FIGS. 12 and 13 show a preferred bearing arrangement 83 the details of which are described below and which may be used instead of the bearing arrangement 54 of FIG. 9. The bearing arrangement 83 consists of a stationary inner bearing portion 29 which gets pushed by an opening 84 over the pedal crank axle 22 and fastened to the bicycle frame 61. The center of the bearing arrangement 83 is in that case offset with respect to the pedal crank axle 22 or respectively the opening 84 as in FIG. 11. A rotatable bearing portion 30 carries on journals 32 bearing rollers 33 which ride along an annular raceway 31 on the stationary bearing portion 29. Instead of the three bearing rollers 33 four or more bearing rollers may also be provided; but at least three rollers are necessary which are distributed uniformly round the circumference in order to guarantee a satisfactory location of the rotatable bearing portion 30 with respect to the stationary bearing portion 29.

Between the bearing rollers 33 free spaces 35 exist in which is arranged a bearing bush 34 for the bearing of the control stud 25. This arrangement of the bearing bush and of the control stud 25 may be effected in approximately the same plane as the bearing rollers 33, which leads to a considerably more compact construction of the pedal crank, gear. The bearing rollers 33 are preferably made as roller bearings pushed onto the journals 32.

Figure 14:
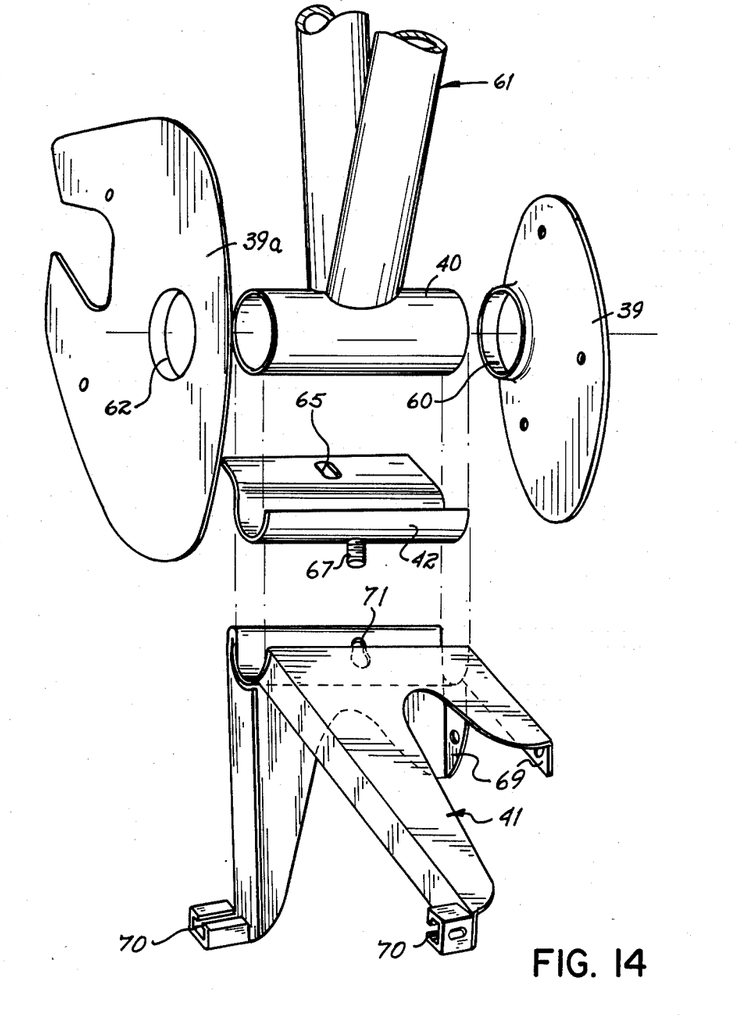
FIG. 14—a perspective of the different means of fastening a mounting of the pedal crank gear in accordance with the invention on the bicycle frame in an exploded view.

The fastening of the pedal crank gear in accordance with the invention to the bicycle frame 61 is to be described below in conjunction with FIGS. 9, 10 and 14. The illustration in FIG. 14 is in this case twisted with respect to that in FIGS. 9 and 10 by about 180°. FIG. 10 shows a clamp arrangement having a first part 42 and a second part 41 in the position in which it gets fastened from below under the frame part 61 and a mounting plate 77 for a bicycle rest.

For the radial location of the bearing arrangements 54 (or respectively the bearing arrangements 83 according to FIGS. 12 and 13) at opposite sides of the frame 61 a carrier disc 39 and 39a respectively is pushed onto each end of a bottom bracket bearing tube 40 by a cut-out 60 and 62 respectively existing in it. The cut-outs 60 and 62 respectively are flanged round and adapted for a firm seating on the ends of the bottom bracket bearing tube 40. The carrier disc 39a provided for the right-hand side (in FIG. 9) represents at the same time an inner part of a chain case. For the axial location of the bearing arrangements the clamp arrangement 42, 41 is provided (FIGS. 10 and 14). The first part 42 of the clamp arrangement includes a rounded part with a drilled hole 66 in which is inserted a stud bolt 67. This rounded part engages under the rounding of the bottom bracket bearing tube 40 when this clamp part 42 gets screwed by means of a screw 68 and an oblong hole 64 to the mounting plate 77. Subsequently the second part 41 of the clamp arrangement gets pushed by an oblong hole 71 onto the stud bolt 67 and screwed up. The second part 41 of the clamp arrangement exhibits fastening angles 69 by which the carrier disc 39 and the bearing arrangement 54 get screwed onto the one side of the frame 61 and the inner part 39a of the chain case and thereby get located axially as well as against tilting, that is, by means of screws, a threaded rod 72 and distance pieces 73. The second part 41 of the clamp arrangement furthermore exhibits two brackets 70 which embrace a sprocket wheel 63 mounted on the pedal crank axle 22 and serve for the fastening of an outer part 64 of the chain case. For the further mounting an angle bracket 74 is also employed.

Through this construction a supporting function is given to the chain case consisting of the two parts 39a and 64, which strengthens the fastening of the pedal crank gear in accordance with the invention to an extraordinary degree, without in doing so leading to a clumsy appearance.

Although the inventive principle has been described and claimed in connection with a pedal crank drive it may obviously also be employed with other drives having a crank of variable length, e.g., in the case of hand crank drives.

I claim:

1. A pedal crank for a pedal crank drive for bicycles comprising a rotatable crank arm, a pedal-carrier arm carried by said crank arm, a control stud carried by said pedal-carrier arm for shifting said pedal carrier arm with respect to said crank arm for varying the effective length of said pedal crank during rotation of said pedal crank, said crank arm comprising a substantially U-shaped member having two limbs, each of said limbs having an inner surface and an outer surface, ball raceways disposed on said inner surface of said limbs, said pedal-carrier arm having ball raceways disposed on opposite portions thereof, a plurality of balls disposed in said raceways, for permitting movement of said pedal carrier arm relative to said crank arm, a cover member embracing said crank arm, said U-shaped member having longitudinal grooves on said outside surface of said limbs, said grooves being continuous over the length of said limbs, said cover member having a substantially U-shaped continuous profile including reentrant limbs, said reentrant limbs being received within said longitudinal grooves of the U-shaped member, said cover member being secured to said U-shaped member, said cover member having an elongated hole formed therein for receiving said control stud, said crank arm having two open ends and endcaps for closing off said ends.

2. The pedal crank of claim 1 in which said cover member further comprises a pedal crank boss for mounting on a bottom bracket bearing axle of a bicycle.

3. The pedal crank of claim 1 in which one of said endcaps comprises a sealing cap, said sealing cap including a first portion engaging the end of said U-shaped member and surrounding said pedal carrier, said sealing cap further including a tongue, said U-shaped member having a tongue receiving longitudinal groove, said tongue being disposed within said last named groove, said sealing cap further including an angle arm having an opening therein, a fastener extending into said opening and engaging said cover member for mounting said cover member to seal the end of said U-shaped member.

4. The pedal crank of claim 3 in which said first portion of said sealing cap includes an opening corresponding to the profile of said pedal carrier arm and means sealing said sealing cap and said pedal carrier arm.

5. The pedal crank of claim 1 in which said cover member has a slidable sealing blade having a second elongated hole, said limbs of said U-shaped member having a recess formed therein, said sealing blade being disposed between said cover member and said recess in said limbs of said U-shaped member.

6. The pedal crank of claim 5 in which a surface of said pedal carrier arm disposed adjacent to said elongated hole is disposed in a plane with said recess in the U-shaped member and forms a sealing surface for said blade.

7. The pedal crank of claim 5 in which said cover member includes an interior, the said interior being unobstructed adjacent to said pedal crank boss, said sealing blade being shiftable to a position adjacent to said pedal crank boss.

8. A pedal crank for a pedal crank drive for bicycles comprising a rotatable crank arm, a pedal carrier arm carried by said crank arm, ball raceways formed on said crank arm and said pedal carrier, a plurality of balls in said raceways for supporting said pedal carrier arm for shiftable movement relative to said crank arm, a control stud carried by said pedal carrier arm for shifting said pedal carrier arm relative to said crank arm during rotation of said crank arm to vary the effective length of said pedal crank, a said ball cage, balls disposed between said ball raceways on said crank arm and on said pedal carrier arm, said balls being guided by said ball cage and being shifted in a direction longitudinal to the pedal crank, locating means consisting of a guide stud between said pedal carrier arm and said ball cage for limiting movement of said ball cage in said longitudinal direction.

9. The pedal crank of claim 8 in which said pedal carrier arm includes two end stops, two compression springs engaging said end stops and said ball cage whereby said cage adopts a position of equilibrium corresponding to different relative positions of said pedal carrier arm and said crank arm.

10. The pedal crank of claim 9 in which said pedal carrier arm includes a longitudinal blind hole and a longitudinal slot communicating with said blind hole, a stopper received within said hole, a guidepin disposed in said longitudinal blind hole between said compression springs, and said guide stud carried by said guidepin and extending through said longitudinal slot, said ball cage including a recess for receiving said guide stud, said guide stud being disposed within said last named recess.

11. A pedal crank for a pedal crank drive for bicycles comprising a crank arm rotatable about an axis, a pedal-carrier arm carried by said crank arm, a control stud carried by said pedal-carrier arm for shifting said pedal-carrier arm with respect to said crank arm for varying the effective length of said pedal crank during rotation of said pedal crank, said pedal carrier arm being shifted with respect to said crank arm whereby the effective length of said pedal crank is lengthened during downwards movement of said pedal crank and is shortened during upwards movement of said pedal crank, bearing means comprising a stationary portion having a central axis disposed eccentrically with respect to said axis of said pedal crank, said stationary portion being adapted to be mounted on the frame of the bicycle, a rotatable bearing member interconnected with said control stud for causing said control stud to move in a circular path eccentric with respect to the axis of said pedal crank, said bearing means comprising at least three bearing rollers supported by said rotatable bearing member, said stationary bearing portion, comprising a bearing race, said rollers riding circumferentially on said bearing race, a bearing bushing carried by said rotatable bearing member, said control stud being supported in said bearing bushing, said bearing bushing being disposed intermediate said bearing rollers and being disposed in approximately the same place.

12. The pedal crank of claim 11 in which said bearing race on said stationary bearing portion comprises a groove which receives said bearing rollers and said bearing rollers engage said groove from outside and ride along it.

13. The pedal crank of claim 11 in which said stationary bearing portion and said rotatable bearing member are sealed with respect to one another to be dust tight.

14. The pedal crank gear of claim 11 in which said pedal carrier arm has a plurality of holes formed therein at different distances from the said axis of the pedal crank, said control stud being selectively engageable with one of said holes.

15. The pedal crank of claim 11 further comprising a mounting for securing said bearing means on opposite sides of a bottom bracket bearing of a bicycle frame, said mounting comprising a carrier disc, said carrier disc being secured to said stationary bearing portion of said bearing means, and having an opening adapted to engage the end of a bottom bracket bearing tube of a bicycle for locating said disc in a radial direction, and a clamp means adapted to be fastened to the frame of a bicycle and said carrier disc for positioning said carrier disc in an axial direction.

16. The pedal crank of claim 15 in which said clamp means comprises a first member adapted to be fastened to a mounting plate of said bicycle and carrying a stud bolt, a second member, said second member having an oblong hole receiving said bolt for securing said second member to said first member, means securing said carrier disc to said second member.

17. The pedal crank of claim 15 in which said carrier disc comprises the inner part of a chain case, said chain case having an outer part secured to said carrier disc and carrying said bearing means.

18. The pedal crank of claim 17 in which said clamp means comprises a plurality of brackets adapted to embrace the sprocket wheel of a bicycle, the outer part of said chain case and said bearing means being secured to said brackets.

* * * * *

UNITED STATES PATENT AND TRADEMARK OFFICE
CERTIFICATE OF CORRECTION

PATENT NO. : 4,807,491

DATED : February 28, 1989

INVENTOR(S) : Freder Stuckenbrok

It is certified that error appears in the above-identified patent and that said Letters Patent is hereby corrected as shown below:

In the Abstract, line 4, after "by" insert --means of--.

Column 2, line 62, omit "-" after "recess".

Column 2, line 17, "is" (second occurence) should be --in--.

Column 3, line 63, "he" should be --the--.

Column 8, line 28, "blow" should be --below--.

Column 11, line 67, "said" should go before "balls", not before "ball cage".

Column 12, line 49, "place" should be --plane--.

Signed and Sealed this

Thirteenth Day of February, 1990

Attest:

JEFFREY M. SAMUELS

*Attesting Officer*     *Acting Commissioner of Patents and Trademarks*